United States Patent [19]

Stacey et al.

[11] Patent Number: 4,651,265

[45] Date of Patent: Mar. 17, 1987

[54] ACTIVE POWER CONDITIONER SYSTEM

[75] Inventors: Eric J. Stacey, Penn Hills Township, Allegheny County; Michael B. Brennen, Pittsburgh, both of Pa.

[73] Assignee: Westinghouse Electric Corp., Pittsburgh, Pa.

[21] Appl. No.: 760,030

[22] Filed: Jul. 29, 1985

[51] Int. Cl.[4] ............................ H02J 3/36; H02M 5/40
[52] U.S. Cl. ........................................ 363/35; 363/39; 363/101; 323/210; 307/105
[58] Field of Search .................... 363/37, 39, 101, 51, 363/35; 323/205, 207–210; 307/105; 320/1

[56] References Cited

U.S. PATENT DOCUMENTS

| | | | |
|---|---|---|---|
| 3,825,814 | 7/1974 | Pelly | 363/39 |
| 3,825,815 | 7/1974 | Gyugyi et al. | 307/105 |
| 4,241,395 | 12/1980 | Stacey et al. | 363/39 |
| 4,555,750 | 11/1985 | Matsumura et al. | 363/51 X |

*Primary Examiner*—Patrick R. Salce
*Assistant Examiner*—Emanuel Todd Voeltz
*Attorney, Agent, or Firm*—C. M. Lorin

[57] ABSTRACT

At least two active conditioners are connected in series with a common DC source, and are mounted as a unit between two pairs of AC terminals to act either as a tie-in link between two AC power sources, as a buck-/boost regulator between one AC power source and its load, or as VAR compensator as well as active power conditioner between phases of a multiphase AC option.

16 Claims, 24 Drawing Figures

ACTIVE POWER CONDITIONER SYSTEM

BACKGROUND OF THE INVENTION

The present invention relates to static controlled active power conditioners.

The present invention extends the field of application of active power conditioners to buck/boost voltage regulation, phase correction, power factor correction, as well as active filtering between a source and a load. The invention is also applicable to multi-phase systems for active filtering and unbalanced load compensation.

The active power conditioner system according to the present invention is derived from the active power filter mounted between a power source and a load for ripple elimination as disclosed in U.S. Pat. No. 3,825,815 of July 23, 1974. The active power filter is a static controlled device connected between the power source and the load to generate a synthetic ripple matching the ripple to be opposed and eliminated. Control is by pulse-width modulation of static switches operating at a high carrier frequency, the carrier being easily removed by filtering.

With a nearly ideal filter characteristic, the active power filter allowed only power of fundamental frequency to flow from the source to the load. The active power filter embodies storage elements, e.g., inductors, or capacitors, which are capable of storing energy in the form of direct current under direct current voltage. The active power filter of the prior art when used as an active power conditioner was only capable of supplying, or absorbing, real power with such inductors, or capacitors, to the extent that losses were compensated. Nevertheless, such active power filters were also used to generate reactive currents with such DC inductors, or DC capacitors, at the fundamental frequency, with either leading or lagging reactive power.

The present invention makes use of the active power filter in such a way that an active power conditioner system is formed having distinct advantages and capable of performing more functions than the aforestated prior art active power filter.

SUMMARY OF THE INVENTION

The invention resides in the combination of at least two active power conditioner elements connected to corresponding power sources, the active power conditioner elements being controlled in such a way that the storage element associated with one active power conditioner element is storing energy into the storage element associated with the other active power conditioner element, or is absorbing energy therefrom, depending upon the operative conditions of the said active power conditioner elements in relation to their respective power sources.

According to one embodiment of the invention, the said combination of active power conditioner elements connected in series and operative with respective power sources is used as a tie-in link between the two power sources.

According to another embodiment of the invention two active power condition elements connected in series are used to provide buck/boost voltage regulation of one AC power source.

According to still another embodiment of the invention, the said series-combination of active power conditioner elements effects phase correction between said AC power sources and/or their phase lines.

According to still another embodiment of the invention, said active power conditioner elements are providing controlled leading, or lagging, reactive power to said AC power sources.

A further embodiment according to the present invention is a multiphase AC power system wherein said combination of active power conditioner elements provides active filtering and unbalance load compensation.

Significant reductions in weight and size, and improved transient response, are provided with such a system when applied to a multiphase AC power supply and load installation.

DESCRIPTION OF THE PREFERRED EMBODIMENTS OF THE INVENTION

In U.S. Pat. No. 3,825,815, issued July 23, 1974, has been described an active power filter including static power switches controlled by pulse-width modulation to build-up and maintain a DC source, of the voltage or current type, and operating either as a DC-to-AC converter or as an AC-to-DC converter, so as to generate a ripple of the same frequency and magnitude as a ripple present on an AC line which is to be cancelled-out by such local ripple generation.

The present invention makes use of this type of active power filter and combines at least two such active power filters so as to, not only extend the domain of the application thereof, but also to effect with such structurally defined active power filter, an active power conditioning element of specific nature and function. Accordingly, for the purpose of providing a full disclosure of the active power conditioner which is part of the present invention, the description of the active power filter and the control thereof as found in U.S. Pat. No. 3,825,815 is hereby incorporated by reference. Nevertheless, for the sake of simplicity, FIGS. 1A, 1B, 1E, 1F, 1H, 2A, 2B which relate more specifically to an active power filter embodying a DC current source, rather than a DC voltage source, are hereby used in FIGS. 1A, 1B, 1C, 1D, 1E, 2A and 2B, respectively. It is understood, however, that the description made in the incorporated by reference patent with regard to a voltage source is also valid, both as supplying an active power filter of the prior art, and as illustrating a device which can be used as an active power conditioner element in a system according to the present invention.

Accordingly, reference will now be made to FIGS. 1A-1E ad 2A, 2B of the accompanying drawings in terms which are similar to the description made in the aforementioned incorporated by reference U.S. Pat. No. 3,825,815.

Figure 1A:
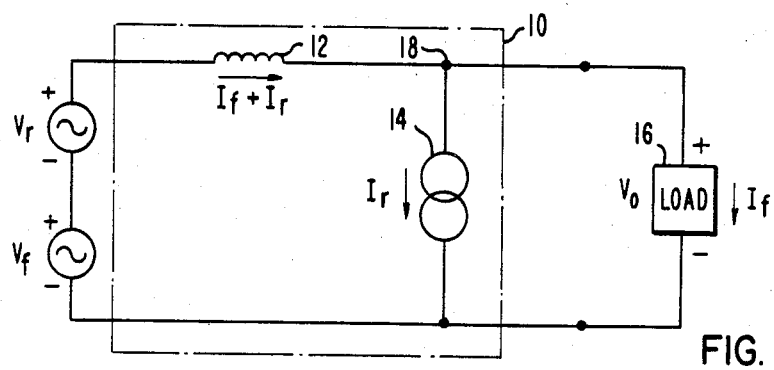
FIGS. 1A to 1D conceptually show active filters of the prior art in four different connecting modes.

With reference to FIGS. 1A-1D, the active filters used according to the invention are conceptually shown in four instances. The waveform to be filtered is composed of a fundamental component $F_f$ and an ensemble of harmonics or "ripple", for simplicity represented by the single voltage source $V_r$. The composite waveform generated by the two voltage sources $V_r$ and $V_f$ is shown in FIG. 1E. $V_f$ comprises, for example, a sine wave having superimposed the ripple voltage $V_r$.

The active element in each of the filters is either a current or a voltage generator. In FIG. 1A, the filter itself is identified by the reference numeral 10, and it includes a series inductor 12 and a shunt current source 14. Connected across the two voltage sources $V_r$ and $V_f$, via inductor 12, is a load 16 through which a load current $I_f$ flows. When utilizing the active filter, the output voltage $V_f$ will be free of harmonics or, at least, the ripple content $V_r$ will be substantially reduced in amplitude, so that an essentially pure sine wave having the same fundamental frequency as $V_f$ will appear across the load.

Assuming that the fundamental input voltage $V_f$ is zero, that the current generator 14 is disconnected, and that the output is shorted, the load impedance is zero.

Under these assumed conditions only a ripple current $I_r$, determined by the harmonic voltage source $V_r$ and the series inductor 12, is flowing in the circuit. It is supposed now, that the short-circuit is removed and a fictitious current generator 14, which generates a current equal to $I_r$, is connected across the output terminals of the circuit. The output voltage remains zero so that no ripple current due to the ripple voltage $V_r$ will flow in the load, but it will circulate through the current generator 14 back to the input source.

It is evident that the application of the fundamental input voltage $V_f$ will not affect the circulation of the ripple current. Since the current generator 14 represents an infinite impedance, the load current $I_f$ determined by $V_f$ and the series impedance of inductor 12 and load 16 will flow in the load, while the ripple current circulates through the current generator back to the input source. Stated in other words, the sum of the currents flowing into and out of point 18 must be zero. Since the current generator 14 has one terminal connected to point 18, and since the current generator 14 generates a current $I_r$ flowing in a direction away from point 18, the only current which will flow through the load 16 is the current $I_f$. As a result, a perfectly filtered voltage of fundamental frequency will appear at the output terminals.

Figure 1B:
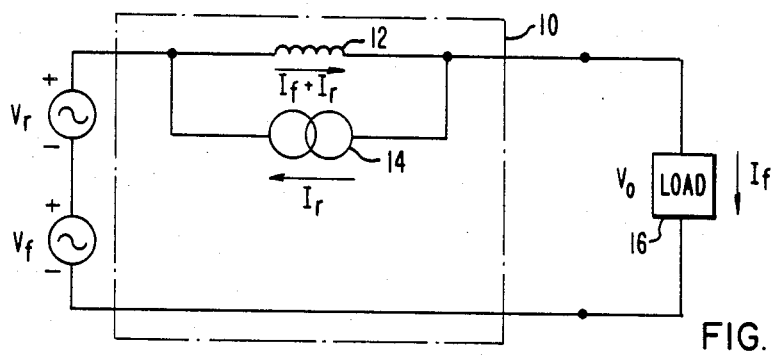

In the case of FIG. 1B, the ripple current circulates in a loop formed by inductor 12 and current generator 14, without flowing through the input source. The operating principle is similar to FIG. 1A.

Figure 1C:
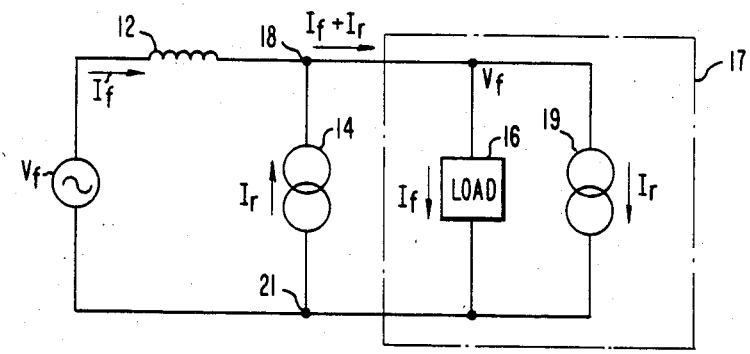

With the theoretical circuits shown in FIGS. 1A-1B, it is assumed that the ripple voltage $V_r$ and the resulting ripple current $I_r$ originate in the source section of the circuit. However, it is also possible that the ripple current be generated in the load section. This is shown in FIG. 1C by the load section being enclosed within broken lines and identified by reference numeral 17. Generated by load 17 which may, for example, be a rectifier or converter, is a ripple current $I_r$ due to what is diagrammatically illustrated as a current generator 19. This current would normally flow through the source $V_f$. However, by placing the current generator 14 across the load which generates a fictitious ripple $I_r$, the ripple current will be shunted, or bypassed around the source section. In this case, currents $I_f$ and $I_r$ flow into point 18, while the sum of currents $I_f$ and $I_r$ flows away from point 18 into the load section 17. At point 21, however, the ripple current from the load section is subtracted from the fictitious ripple generated by generator 14 so that the resulting ripple current, flowing through the source, is zero.

Figure 1D:
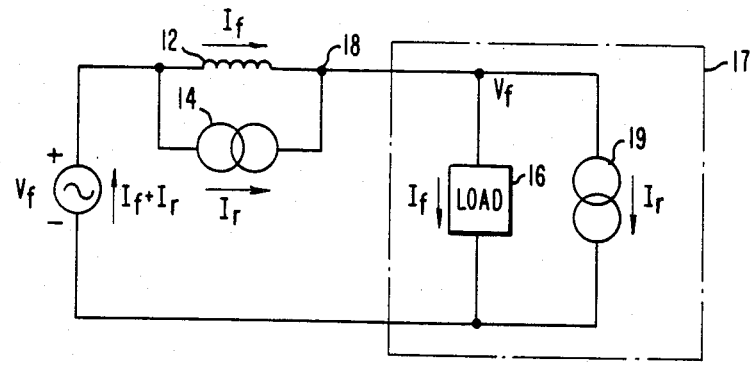
Figure 1E:
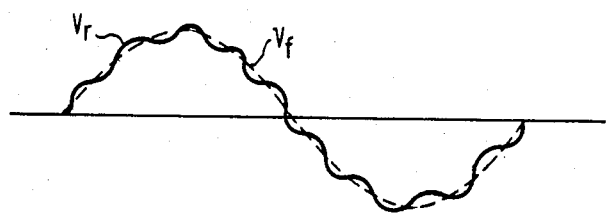
FIG. 1E is a curve illustrating how ripple to be eliminated is superimposed on the fundamental sine wave between input power and load.

In FIG. 1D, a similar arrangement is shown wherein the load section 17 generates a ripple current $I_r$. The current generator 14 is connected in shunt with inductor 12. Assuming that inductor 12 represents the internal inductance of the source section, it will be appreciated that by connecting the current generator 14 in shunt with it, the ripple current $I_r$ bypasses the source inductance 12, thereby producing no ripple voltage across load section 17.

The circuits shown in FIGS. 1A-1D are, of course, purely theoretical. The principal problem with active filters, theoretically shown in FIGS. 1A-1G, is the practical realization of the current and voltage sources employed. Although these sources could be realized by linear active circuits, in order to obtain the high efficiency necessary for power applications, preferably semiconductor switches and reactive storage elements (e.g., inductors and/or capacitors) are utilized. The basic approach is to produce the required alternating voltage, or current source, from a suitable DC voltage or current source, hereafter referred to as DC source, by pulse modulation techniques. For the DC source, passive storage elements are employed which are kept appropriately charged by proper control of the switches used in the modulation process.

Figure 2A:
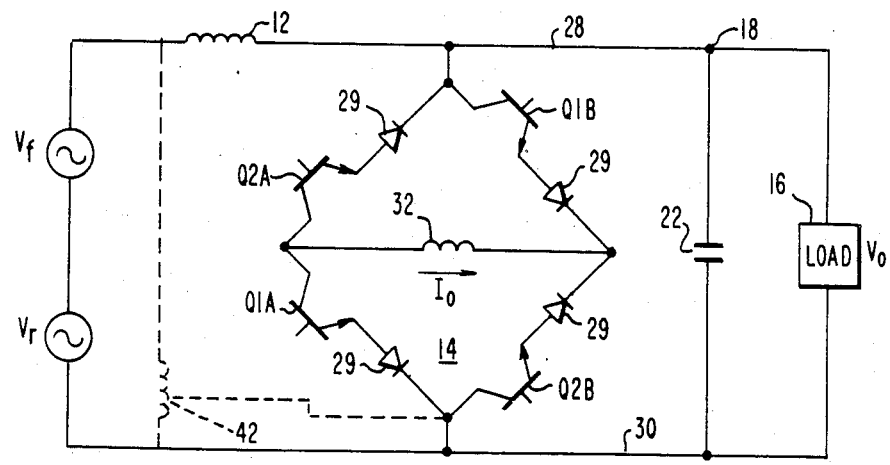
FIGS. 2A and 2B illustrate shunt and series current controlled active power filters of the prior art.
Figure 2B:
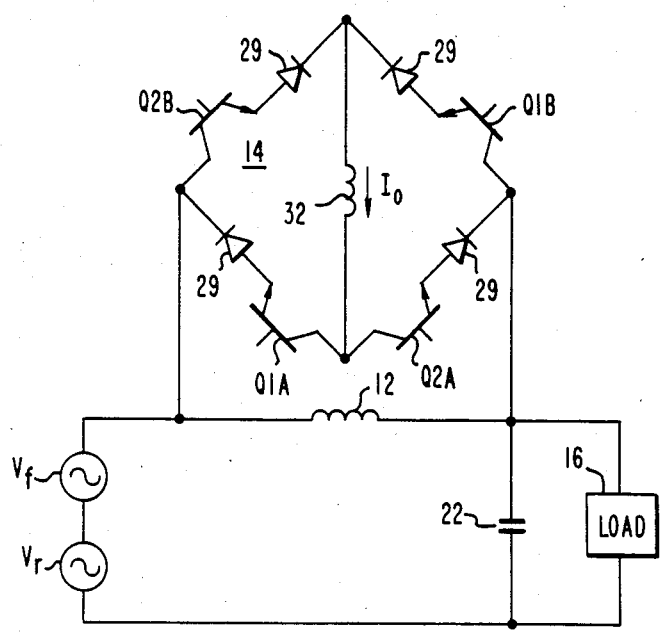

Practical realizations of the theoretical circuits shown in FIG. 1A–1D are illustrated in FIGS. 2A–2B wherein elements corresponding to those of FIGS. 1A–1D are identified by like reference numerals. The circuits of FIGS. 2A–2B illustratively utilize direct-current sources in the form of charged inductors providing the required alternating current or voltage generators. Assuming that such DC source has sufficient magnitude, the previously considered (voltage, or current) generators of FIGS. 1A–1D can be realized by alternately connecting the DC source, via opposite pairs of switches in a network (i.e., Q1A, Q1B and Q2A, Q2B), during controlled time intervals. In effect, by controlling or modulating the closure of the switches, the waveforms (current, or voltage) of the alternating current or voltage generators used in the theoretical circuits of FIGS. 1A–1D can be reproduced. Of course, this process also produces harmonics. However, by operating the switches at a sufficiently high rate, the frequencies of the "switching" harmonics, so produced, can be kept as high as desired. Therefore, there is only need to add a relatively small passive filter, such as capacitor 22 in FIGS. 2A and 2B, to absorb the unwanted switching harmonics and obtain a clean sinewave output.

The circuit of FIG. 2A corresponds to that of FIG. 1A, the current source 14 comprising a bridge circuit having transistor switches in its four legs. Two of the terminals of the bridge are connected to leads 28 and 30 connecting the source to the load 16; whereas the other two terminals of the bridge are interconnected by an energy-storing inductor 32. As will be seen in the modulation process, either transistors Q1A and Q1B will conduct, or transistors Q2A and Q2B will conduct, depending upon whether the instantaneous value of the output voltage is greater, or smaller than that of the fundamental component. That is, one set will conduct when the output voltage is greater by a preselected amount than the wanted fundamental component at point 18. The other set will conduct when the output voltage is smaller by the preselected amount than the fundamental component. In either instance, the required ripple compensating current will be generated provided that a unidirectional current $I_o$ will flow through the inductor 32 at all times. Blocking diodes 29 are placed in series with each transistor in the bridge so as to prevent reverse conduction. The arrangement of FIG. 2B corresponds to that of FIG. 1B wherein a similar bridge circuit is connected in shunt with the inductor 12 and comprises the current source 14.

In order to maintain the DC current $I_o$ and compensate for the losses, a fundamental component of current from the AC source which is in phase therewith must be absorbed.

Figure 3:
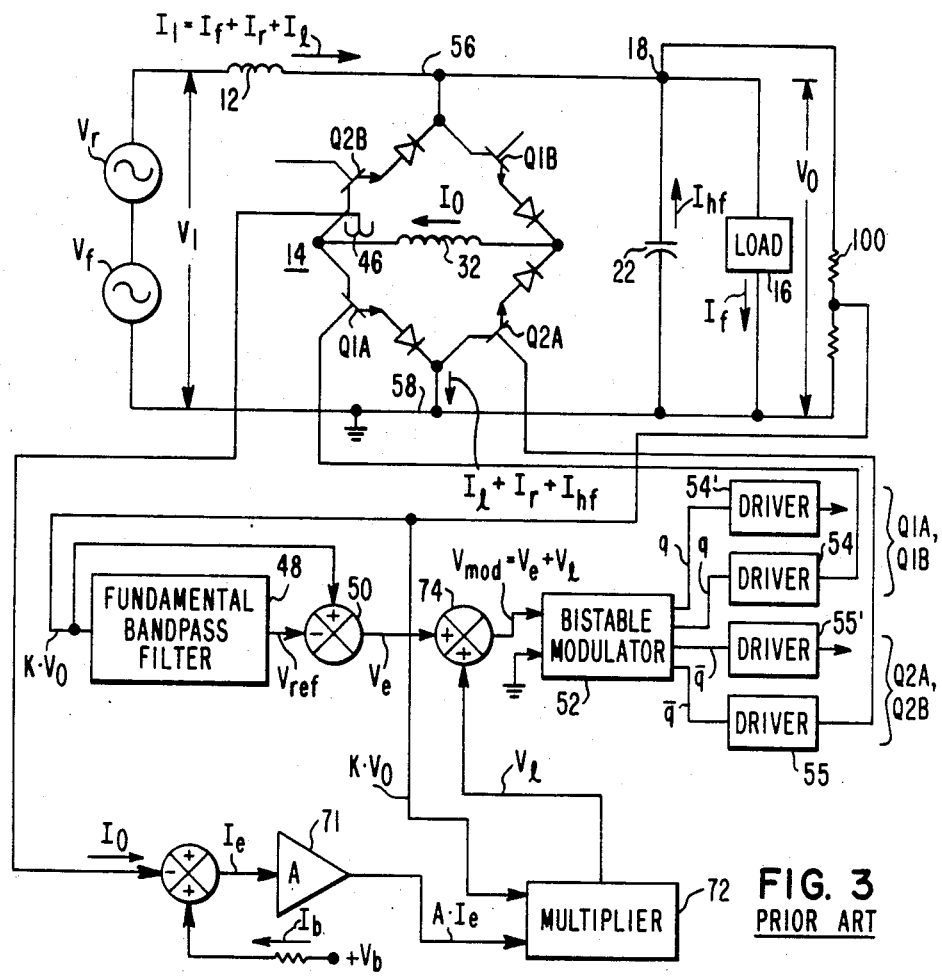
FIG. 3 illustrates the control organization of a shunt current controlled active power filter like in FIG. 2A.

The basic control of the output active filter, using, for the sake of illustration, a shunt current controlled generator, can be explained by reference to FIG. 3. The control circuitry for transistors Q1A, Q1B and Q2A, Q2B is connected to terminal 18 as well as to current transducer 46, which senses the DC current $I_o$ flowing into DC inductor 32. In FIG. 3, the input voltage $V_1$ contains the fundamental component $V_f$ and an ensemble of harmonic voltages $V_r$. It is desired to filter out the output voltage $V_r$ to obtain a sinusoidal voltage of fundamental frequency. To do so, the active generator 14 must be modulated so as to generate $I_r$ in such phase relationship as to absorb the ripple current flowing through inductor 12 and produced by $V_r$. In addition, since the active filter 14 has losses, additional modulation of the active filter 14 must be provided to produce a fundamental current component $I_L$ in phase with the source voltage $V_f$, thereby enabling the active filter 14 to absorb power from the input source and thereby replenish these losses. In order to insure that sufficient DC current $I_o$ be present in inductor 32, means must be provided to regulate the amplitude of the loss modulation signal to a degree sufficient to compensate for all losses in the inductor 32, with the help of the switches Q1A–Q2B. In addition, the DC current $I_o$ is regulated at a fixed amplitude.

In order to understand the basic operation of the control circuit shown in FIG. 3, one should consider two parts of the control in accordance with the modulation $V_{mod}=V_e+V_L$. $V_e$ is the error obtained by subtracting the sinusiodal reference voltage $V_{ref}$ from the output voltage $V_o$. $V_e$ represents the component of modulation (after $V_e$ is processed in the modulator) which requires filtering.

$V_L$ is a modulating signal which is a portion of the output voltage $V_o$. It represents the component of modulation used to provide loss compensation for maintaining the DC current $I_o$. $V_L$ is derived by comparing the amplitude of the DC current $I_o$ with a fixed DC reference current $I_b$. An error $I_e$ derived therefrom is passed through a proportional-integral (PI) function providing a DC output A. $I_e$ is, then, multiplied at 72 by $V_o$ (or some fraction K thereof) in order to provide toward summer 74 the losses component $V_L$.

To obtain a sinusoidal voltage from the voltage $V_o$ at point 18, it is first necessary to establish the sinusoidal reference waveform $V_{ref}$ obtained at 48 by passing the voltage $KV_o$ through a bandpass filter 48 tuned to the fundamental frequency. The reference voltage $V_{ref}$ at the output of filter 48 is, then, subtracted at 50 from the voltage $KV_o$ (proportional to actual output voltage), at summing point 50, to derive an error voltage $V_e$. If the losses are neglected (i.e., $V_L=0$), the error voltage $V_e$ from derived subtractor 50 is applied to a bistable modulator 52, which is a bistable device having a narrow hysteresis loop, or dead-band (such as a Schmitt trigger circuit). The output of modulator 52 is either "1" or "0" depending upon whether the error voltage $V_e$ is greater than zero, or less than zero, when triggering the bistable circuit 52. The complementary outputs of modulator 52 are used as inputs to the respective drive circuits (54, 54') and (55, 55') which amplify the complementary output signals q and $\bar{q}$ to provide the drive for transistors (Q1A, Q1B), (Q2A, Q2B). As a result, either Q1A and Q1B, or Q2A and Q2B are ON depending upon the output of modulator 52.

Figure 4A:
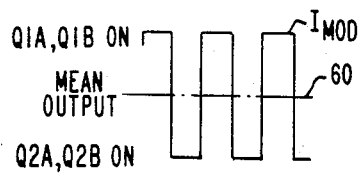
FIGS. 4A to 4E illustrate, with drives, pulsewidth modulation as effected with the control circuit of FIG. 3, still in the context of the prior art.
Figure 4B:
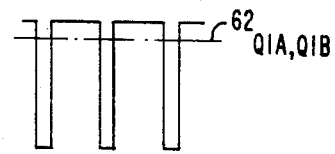
Figure 4C:
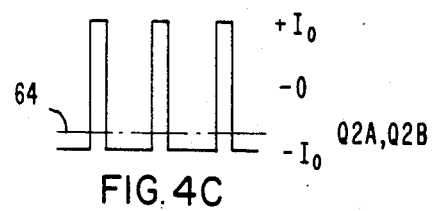
Figure 4D:
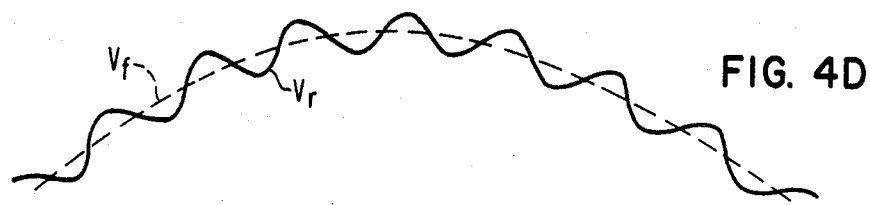
Figure 4E:
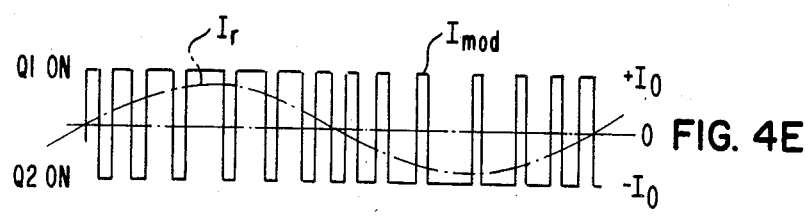

The modulation technique utilized in the circuit of FIG. 3, is best understood by reference to FIGS. 4A–4E. The inductor 32 can be considered to be a direct current source. Transistor switches Q1A, Q1B, Q2A, and Q2B are operated alternately so that at any instant either transistors Q1A, Q1B are ON when Q2A and Q2B are OFF, or vice versa. Thus, the direct-current source (i.e., inductor 32) is connected to terminals 56 and 58 of FIG. 3 by the alternate closing of transistor switches Q1A, Q1B and Q2A, Q2B. When switch Q1A, Q1B are closed, DC current $I_o$ flows from terminal 56 to terminal 58 through Q1B, inductor 32 and Q1A, whereas when switches Q2A, Q2B are closed, DC current flows from terminal 58 to terminal 56 through Q2A, inductor 32 and Q2B. The actual modulation current $I_{mod}$ flowing between terminals 56 and 58 through the active filter 14 is, thus, of rectangular form as shown in FIGS. 4A-4C. IF switches Q1A, Q1B and Q2A, Q2B are closed during equal times, a symmetrical square-wave current results as shown by FIG. 4A, the mean value 60 being zero. If switches Q1A, Q1B are ON longer than switches Q2A, Q2B, then, the waveform is no longer symmetrical as shown in FIG. 4B and the mean value 62 of the current $I_{mod}=I_L+I_r$ ($I_L$=current for the losses, $I_r$=ripple current), flowing between terminals 56 and 58, is now positive. On the other hand, if switches Q2A, Q2B are closed longer than switches Q1A, Q1B, as shown by FIG. 4C, the mean value 64 of the current $I_{mod}$ flowing between terminals 56 and 58 will be negative.

It can be seen, therefore, that by varying the relative closure times of transistor switches Q1A-Q2B, the mean value of the current $I_{mod}$ flowing between terminals 56 and 58 can be varied. Furthermore, if the actual switching rate is high, by suitably modulating the relative conduction periods of switches Q1A-Q2B, the mean value of the current $I_{mod}$ flowing between terminals 56 and 58 may be controlled to synthesize the ripple current $I_r$, as illustrated for a sinusoidal ripple current in FIG. 4E. In this respect, with reference to FIG. 4D, the fundamental voltage $V_f$ has superimposed thereon the ripple voltage $V_r$ as shown. At subtracting point 50 in FIG. 3, these two voltages (or voltages proportional thereto) are effectively compared. When one voltage exceeds the other by a selected amount, the trigger circuit 52 turns one pair of the switches Q1A, Q1B, or Q2A, Q2B ON. When the opposite condition exists, the other pair of switches is turned ON. The effect of switching ON transistors (Q1A, Q1B), or (Q2A, Q2B) is to inject the DC current $I_o$ flowing within inductor 32 into junction 56 with one polarity or the other, thereby causing the voltage $V_e$ to increase, or decrease. In order to insure that the output voltage $V_o$ is essentially sinusoidal, the closures of transistors Q1A, Q1B and Q2A, Q2B must be modulated in such a manner that the mean value of the current injected into junction 56 synthesizes the ripple current $I_r$, as previously described and illustrated in FIG. 4E where one cycle of the ripple current $I_r$ together with the modulated current $I_{mod}$ is shown enlarged with respect to the ripple shown in FIG. 4D.

In order to insure that sufficient direct current $I_o$ be present in the inductor 32, some means must be provided to insure that $I_o$ does not fall below the peak value of $I_r$. Enough power must be supplied to the active element 14 to compensate for internal losses. If there is not enough real power supplied in the form of a fundamental current $I_l$, in phase with $V_o$ to the current generator 14, it will not be possible to maintain a direct current $I_o$ in the inductor 32 nor to effect proper filtering.

In order to insure that $I_o$ is greater than the peak value of $I_r$, a current transformer 46 (FIG. 3) is used to monitor the current $I_o$. Current $I_o$ is comprised of three constituents $I_r$, $I_L$ and $I_{hf}$, that is $I_o=I_r+I_L+I_{hf}$, where $I_{hf}$ is the high frequency ripple, produced by the modulation process, which is essentially absorbed by filter capacitor 22. The output of current sensor 46 is amplified by amplifier 71 and used to control the magnitude of signal $V_L$ by multiplying the AC signal $KV_o$ by the integrated DC error signal $AI_e$. The signal from the output of multiplier 72 is fed via summing point 74 to the input of the bistable modulator 52 so as to provide a fundamental component of modulation to the switches or transistors Q1A, Q1B and Q2A, Q2B thereby to cause a fundamental component of current $I_L$, in phase with $V_e$, to flow in the current generator 14. This provides the necessary energy ($V_o \times I_L$) to overcome the losses in the current generator 14 and to maintain the direct current $I_o$ in the inductor 32. An equilibrium is established when $V_{loss}$ is such that $I_o$ is maintained at a fixed level.

Having explained heretofore control and operation of a conditioner element of the prior art, the preferred embodiments of the present invention will now be described.

Figure 5A:
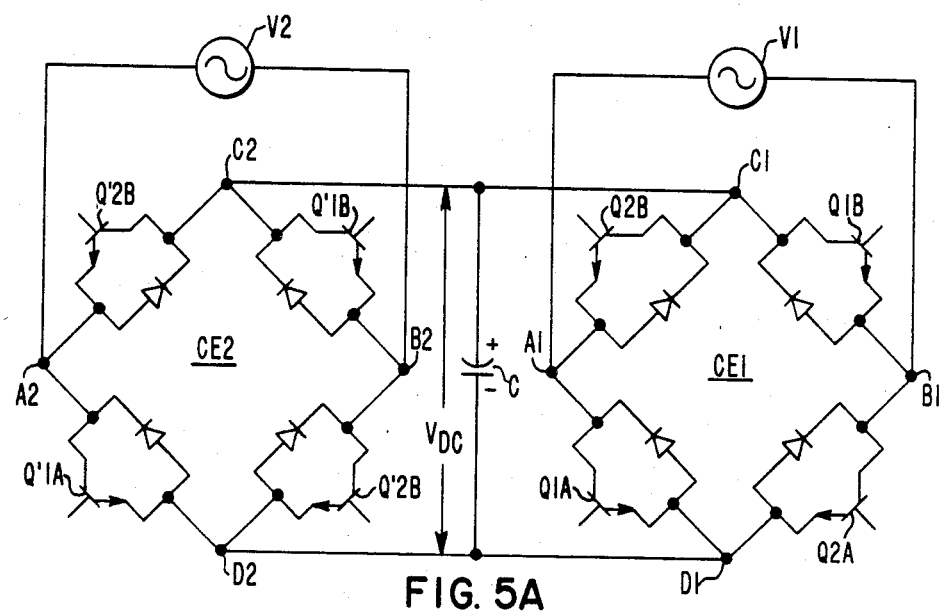
FIGS. 5A and 5B show two AC power sources with a tie-in link therebetween consisting of two active power conditioning elements having in common a DC source of the voltage source type (FIG. 5A) or of the current source type (FIG. 5B).
Figure 5B:
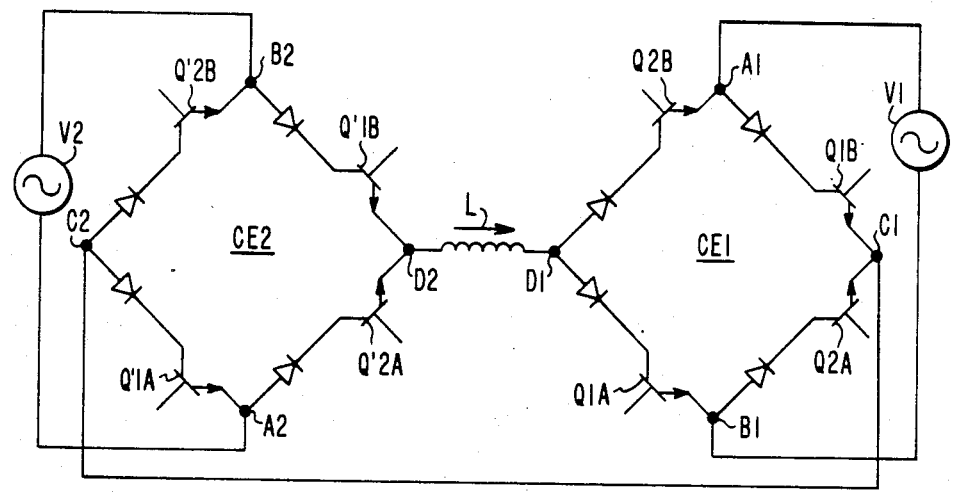

Referring to FIG. 5A two conditioner elements CE1 and CE2 are shown forming a tie-in link between an AC power source (V1) and another AC power source (V2). The diagonals C1D1 and C2D2 of the bridges CE1, CE2 are connected across a common capacitor C. The opposite diagonals A1B1 and A2B2 are connected to power sources V1 and V2, respectively. The two conditioner elements CE1, CE2 have, thus, a voltage source in common. DC voltage is generated from one side, or the other, in order to maintain a constant DC voltage thereacross. If the first conditioner element CE1 is operated as an active element fed from the first AC power source V1, and is controlled to maintain the voltage in DC source, the second active element is controlled to transfer power from the DC source to the second AC power source V2, or vice versa. By controlling the first active element only to regulate the DC source and the second active element only to convert the DC source into fundamental current for the second AC source, the DC voltage is maintained and power can be transferred between the two AC power sources independently. The same can be said of the two conditioner elements CE1 and CE2 which, as shown in FIG. 5B, have to diagonals C1D1, C2D2 in series in a common loop with an inductor L forming a current source, and two other diagonals A1B1, A2B2, connected to power sources V1, V2, respectively. Control of the conditioner elements concurrently and separately provides for transfer of power between the two AC power sources and regulates the current flow between the two diagonals in the current source, through inductor L. Capacitors C1 and C2 across the opposite diagonals are provided to by-pass high frequency signals.

It is observed that the two AC power sources need not be synchronous, nor have the same frequency. They also may have different voltages. It is only necessary that the magnitude of the DC current be sufficient to produce AC current of the required magnitude and power with respect to the AC power source having a lower voltage level.

In addition to effecting a transfer of real power between two independent AC power sources of different frequencies and amplitude, the tie-in link, according to the invention, allows each active element to be independently controlled so as to independently supply, or absorb, reactive power, and to provide active filtering for its associated AC power source.

This will be more apparent from a consideration hereinafter of various embodiments tending to illustrate specific applications of the invention as well as to demonstrate the possibility of a generalization in different directions.

Figure 6A:
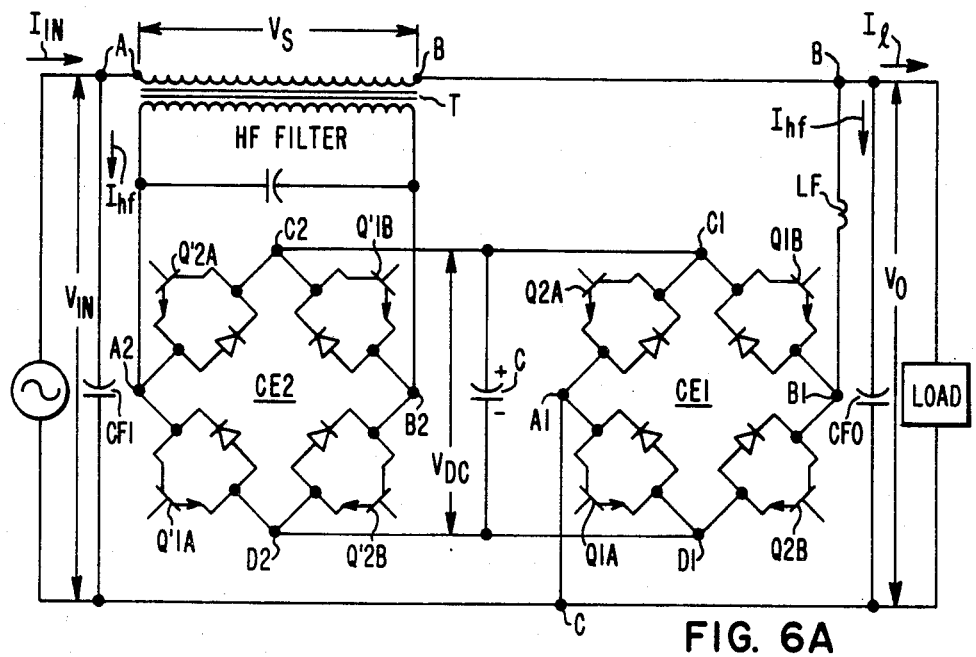
FIGS. 6A and 6B are like FIGS. 5A and 5B, with such link being between a buck/boost voltage associated with one AC power source and a load coupled to said power source, thereby to provide with a common DC voltage source (FIG. 5A) or with a common DC current source (FIG. 5B) buck/boost voltage regulation.

Referring to FIG. 6A, the buck/boost regulator system according to the present invention is shown to include power conditioning elements CE1 and CE2, each generally as described in the context of aforementioned U.S. Pat. No. 3,825,815. Thus, they each illustratively include two pairs of static switches (Q1A, Q2A), (Q1B, Q2B) forming a bridge between diagonally opposite terminals, the switches being pulsed-width modulated by pairs so as to effect a power transferring function in one direction, or the other, between such terminals.

In FIG. 6A is shown a conditioning element CE1 having one diagonal A1B1 in shunt across nodal points B and C of two AC lines extending from an AC source (of voltage $V_{in}$) to a load (voltage $V_o$ thereacross). The second conditioning element CE2 has one diagonal A2B2 coupled in series between two modal points A and B on one of the AC lines. Coupling is effected with a transformer T having windings W1 and W2. The two conditioner elements CE1, CE2 have their respective opposite diagonals C1D1, C2D2 connected to a common voltage source $V_{DC}$ illustrated by a capacitor C.

$i_{IN}$ is the current flowing from source $V_{IN}$, while $I_{LOAD}$ is the current flowing into the load. A capacitor CFO is provided across the load to filter thereacross high frequency current $i_{HFO}$, while a capacitor CFI filters across the source $V_{IN}$ high frequency current $i_{HFI}$. Between terminals B and C, is an inductor LF. It appears that CE1 and CE2, on opposite sides of the DC voltage source $V_c$, as a unit, behave like a four-quadrant inverter with regard to their Ac terminals (between B and C for CE1, between A and B for CE2). It is intended to maintain $V_o$ constant. To this effect, whenever $V_{IN}$ is reduced, a voltage $V_s$ is generated by the unit operating as a buck/boost regulator between A and B to compensate for the decrease of $V_{IN}$, and conversely when $V_{IN}$ tends to increase and a voltage $V_s$ has to be opposed to it. In this respect, it is observed that $V_{IN}$ and $V_o$ being in phase, the generated voltage $V_s$ will be either generated in phase with adequate magnitude when adding $V_s$ to $V_{IN}$, or it will be generated out-of-phase (180°) with adequate magnitude when $V_s$ has to be subtracted from $V_{IN}$. When $V_{IN}$ and $V_o$ are not in phase, the generated voltage $V_s$ will be such as to be vectorially combined with $V_{IN}$ and $V_o$ so as to buck, or boost, $V_{IN}$.

When conditioner element CE2 is adding voltage $V_s$ i.e. boosting, energy is absorbed by CE2 from the DC source. Automatically conditioning element CE1 will absorb real power from the AC lines between B and C (and through inductor LF) which is fed into the DC source for compensation of the action by CE2. Conversely, when CE2 is bucking the voltage $V_{IN}$ by an amount $V_s$, energy is absorbed through transformer T and fed into the DC voltage source (capacitor C). At the same time, conditioner element CE1 will absorb as much real power from the DC voltage source and return it through inductor LF in the link back between B and C. These functions of an inverter are well known in the art. It is also recalled that in U.S. Pat. No. 3,825,815, the function of conditioner element CE1, when acting as an active filter, has been fully described.

It is understood that, in the present instance, the DC voltage $V_c$ across capacitor C is used as a reference signal, and control of the four power switches of bridge CE1 is effected by pulse-width-modulation so as to generate, or absorb, real power to the extent that conditioning element CE1 is absorbing, or generating, real power, thereby maintaining $V_c$ constant.

Figure 6B:
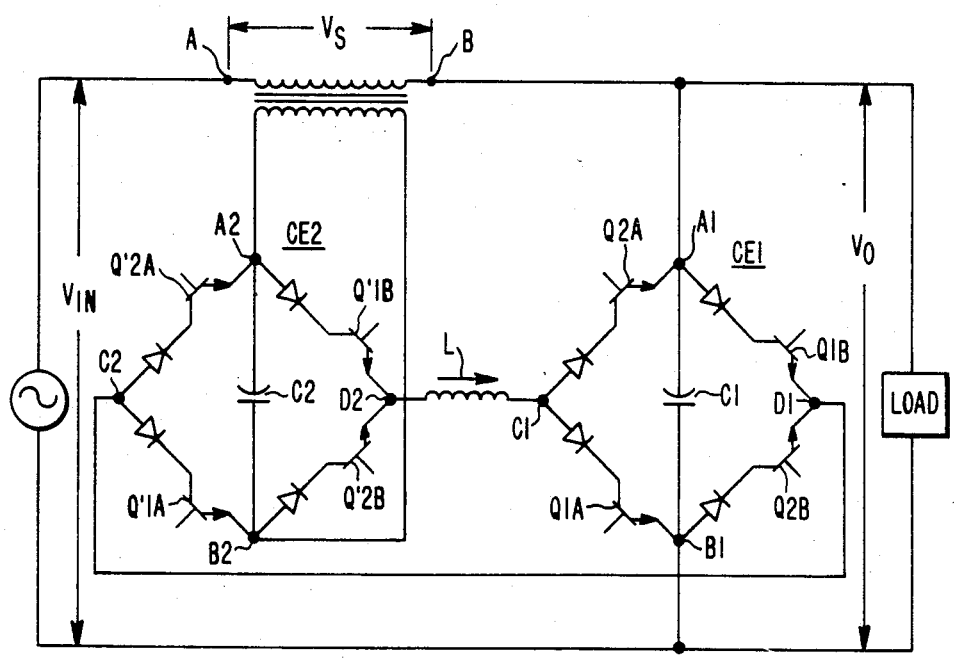

Referring now to FIG. 6B, the two conditioning elements CE1, CE2 are shown, each with one diagonal C1D1, C2D2 connected to a common DC current source (L). Capacitors C1 and C2 are shown across the opposite diagonals A1B1, A2B2 respectively. These capacitors are used to provide a shunting path for the high frequency signal due to the carrier of the pulse-width-modulation control. When the pair (Q1A, Q1B), or (Q2A, Q2B), is ON (in the respective conditioner elements) current flows in one direction along the closed loop as seen by the DC source terminals of one conditioner element, and in the opposite direction in the same closed loop as seen by the DC source terminals of the other conditioner element, whereby the inductance L operates as a DC current source which contains the same amount of real power.

In the same manner as for FIG. 6A, a voltage $V_s$ is generated between A and B which may be in phase, when boosting, or out-of-phase when bucking, if $V_{IN}$ and $V_o$ are in phase, or $V_s$ may add, or subtract, vectorially if $V_{IN}$ and $V_o$ are not in phase. In this case, a DC current sensor (46 in FIG. 3) is used to detect the unbalance of power caused in the closed loop by CE2 and restore equilibrium through CE1. The configuration of conditioner element CE1 in FIG. 6B will be recognized as the same as in FIG. 3, where inductor L occupies the same position within the diagonal, but where, on the same diagonal and in series with such diagonal branch, another conditioner element CE2 has been inserted in series with inductor L. Control and operation of CE1 are, thus, the same, except for the intervening effect of control and operation of CE2 altering the value of $I_o$ and forcing an exchange of real power between CE1 and the AC lines.

Figure 7:
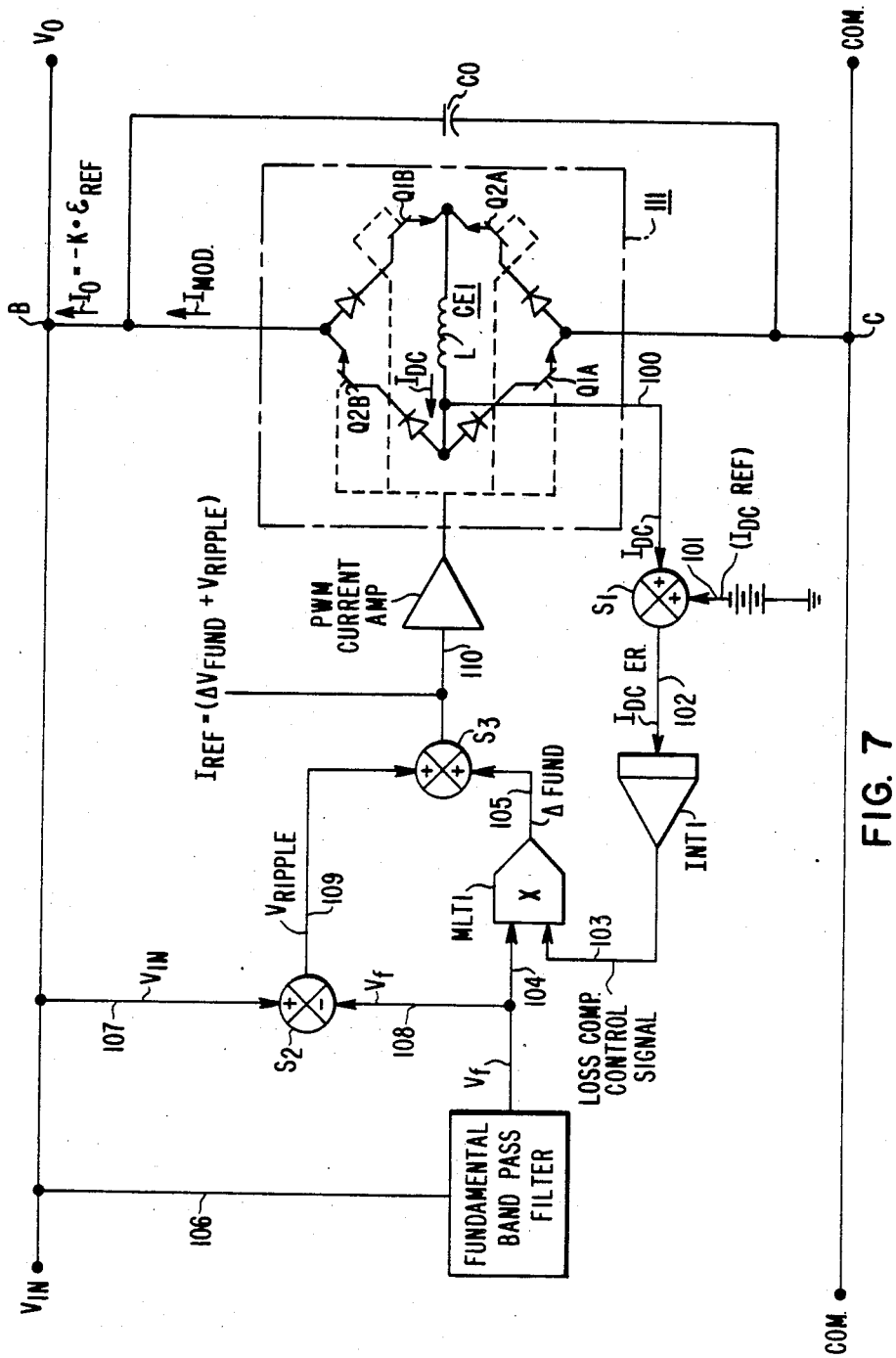
FIG. 7 is circuitry as can be used for control of the parallel current source power active filter section of FIG. 6B.
Figure 8:
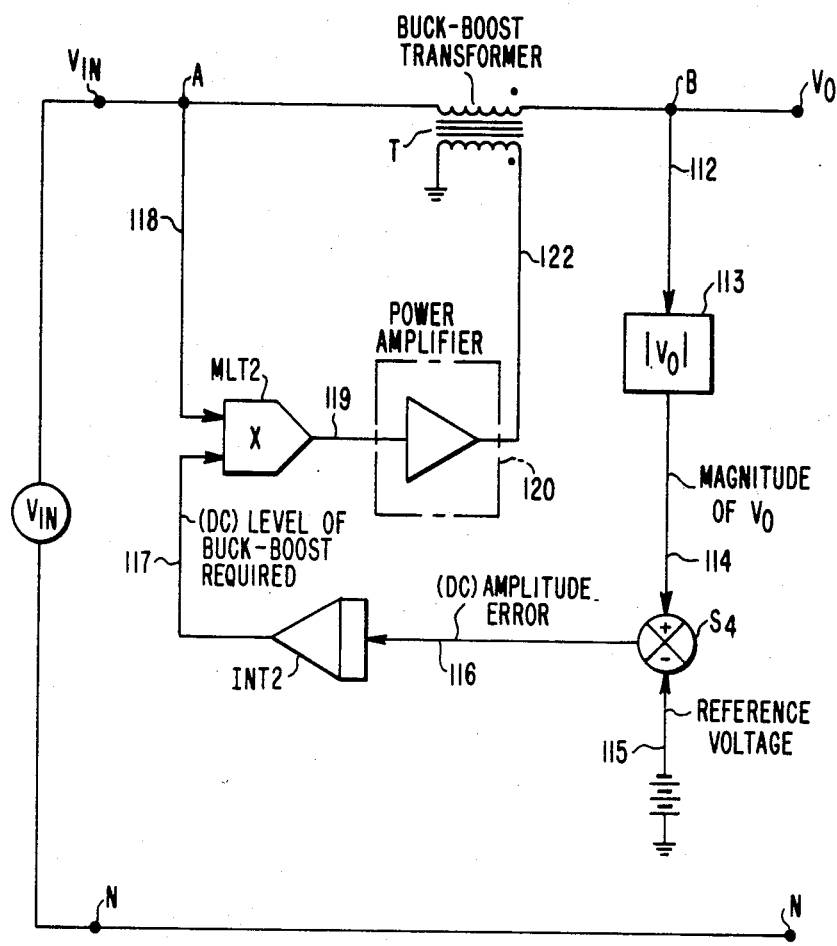
FIG. 8 is circuitry as can be used for control of the buck/boost regulator section of FIG. 6B.

FIG. 7 shows control of conditioner element CE1 and FIG. 8 shows control of conditioner element CE2. Referring to FIG. 6, the DC current flowing in the closed loop of the DC current source is sensed and by line 100 the sensed signal is carried to a summer S1 which also receives a negative reference signal from line 101. The error outputted on line 102 is passed through an inverting integrator INT1 which outputs the loss compensating control signal on line 103 into a multiplier MLT1. A signal representative of the voltage fundamental $V_f$ is derived from $V_{IN}$ (assumed to include a ripple) via a fundamental band-pass filter, and signal $V_f$ is supplied by 104 to the multiplier MLT1. Thus, to the extent of the signal of line, 103 a fraction of $V_f$ is derived on line 105 at the output of multiplier MLT1. A signal representative of $V_{IN}$ on line 107 is compared with the signal $V_f$ from lines 104 and 108, to derive at the output of subtractor S2 a signal representing the ripple. By line 109, signal $V_{ripple}$ is added to the signal of line 105 to provide from summer S3 the control signal applied by line 110 to the pulse-width-modulation current amplifier 111, whereby Q1A, Q1B and Q2A, Q2B will bring current DC on the diagonal of inductor L (that is the closed-loop of FIG. 6B) to a level matching the reference of line 101. Such effect on the diagonal of CE1 is matched by a flow of current $I_{mod}$ between B and C due to the modulation of Q1A, Q1B, Q2A, Q2B, and $i_o$ flowing to the load under voltage $V_o$ is in relation to the signal of line 110. All this is in accordance with the teachings of FIG. 3 and of U.S. Pat. No. 3,825,815.

Sensing of current $i_{DC}$ flowing into or out of inductor L can be effected with a DC transducer such as disclosed in "A Direct Current Transformer" by R. C. Marshall in *Instrum. Engr.*, (G.B.) Vol. 4, No. 2 (Oct., 1964) pp. 21-5; or in U.S. Pat. No. 3,573,616 of IBM issued Apr. 6, 1971.

Referring to FIG. 8, while $V_{IN}$ on the source side is variable, the voltage $V_o$ on the load side is to be maintained constant. To this effect the buck/boost regulator of FIGS. 6A or 6B generates through transformer T a corrective voltage $V_s$. From line 112, by sensor 113 and by line 114, the magnitude of voltage $V_o$ is sensed and compared to a reference on line 115 by comparator S4. The error on line 116 is passed through an inverting integrator INT2, and the signal so outputted on line 117 becomes a multiplying factor for the value of a signal representing $V_{IN}$ derived from line 118. Multiplier MLT2 outputs on line 119 a corrective buck/boost reference voltage signal, which enters the PWM controlling means (120) for conditioner element CE2 which functions with feedback as a voltage amplifier. The resulting effect is schematically shown by line 122 to one end of the primary of transformer T, the other end being to ground.

Figure 9:
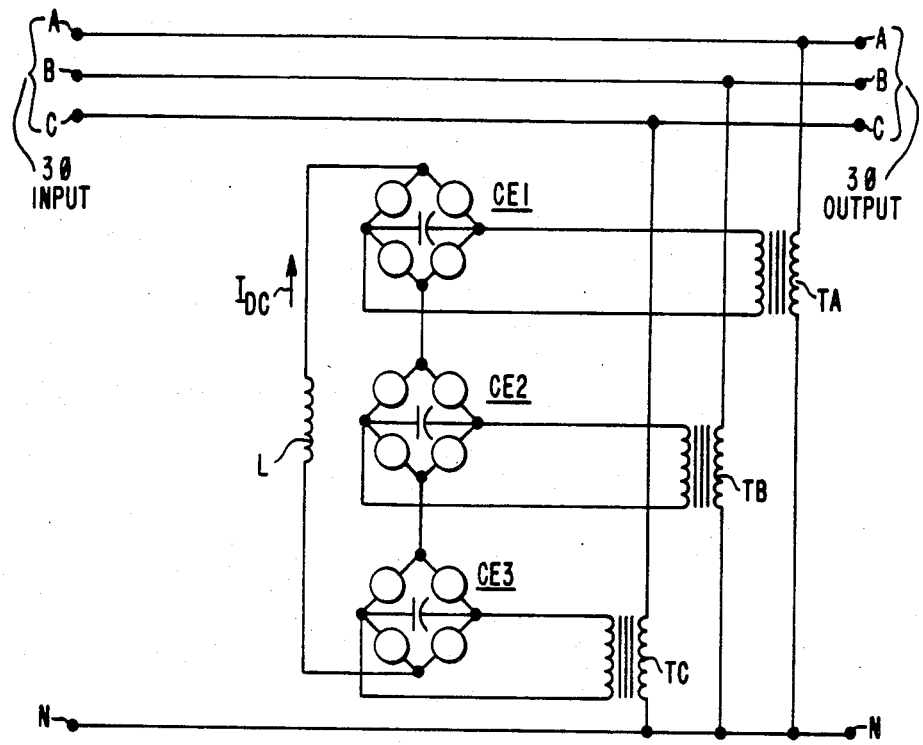
FIG. 9 shows a combination of three power active filters as can be used in a three-phase system, between phase lines and neutral, to compensate for unbalance and to effect static VAR compensation.

Referring to FIG. 9 another aspect of the present invention is illustrated by three conditioner elements CE1, CE2, CE3 inserted in a closed loop including an inductor L which forms a common DC current source, like between CE1 and CE2 in FIG. 6B. Here, however, there is no buck/boost voltage regulator function provided. The three conditioner elements CE1, CE2, and CE3 have their opposite diagonals, respectively connected between one phase line (A, B, or C) and neutral(N), for the three respective phases of a three-phase AC power supply, thus, between an AC input voltage $V_{IN}$ and an AC output voltage $V_{out}$. The three conditioner elements are controlled separately in response to a DC current source reference and an AC line phase reference. This will permit to achieve either load compensation between unbalanced phases (ahead, or after the shunt connection), or static VAR compensation, or active power filtering, or all three features concurrently. It is understood that by appropriate PWM modulation of two pairs of switches (Q1A, Q1B) (Q2A, Q2B), in each phase in response to the instantaneous AC phase voltages, the DC current can be maintained; the ripple and fundamental unbalance compensation currents being furnished to the three AC phases, in the same way as explained by reference to FIG. 3. Transformers TA, TB and TC couple the outputs of CE1, CE2, CE3 with the respective connection lines, namely, between phase line A, B, C and neutral.

Figure 11:
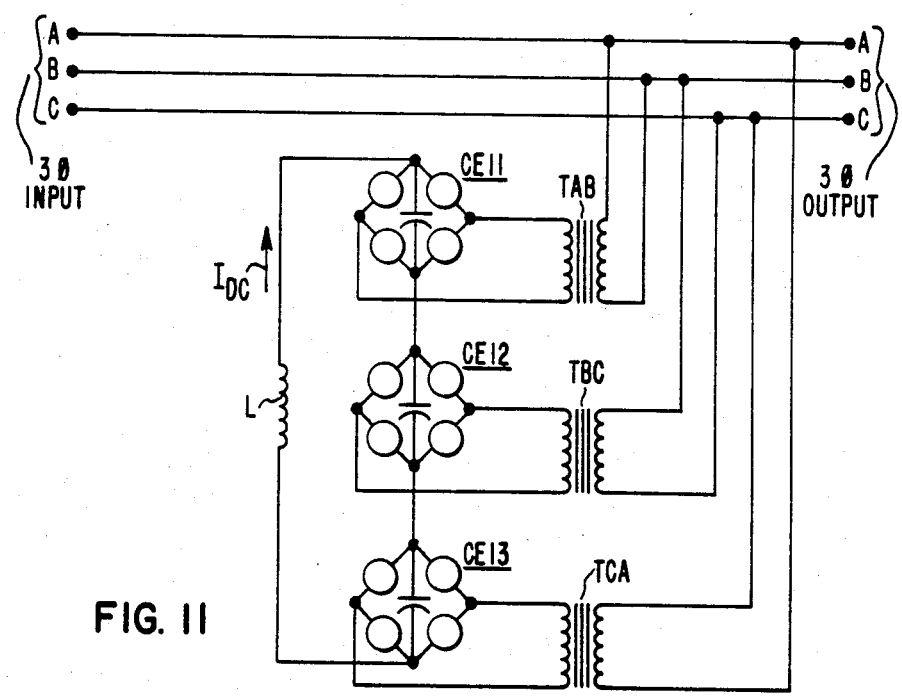
FIG. 11 shows circuitry in which three conditioner elements are mounted in parallel between the phase lines of a three-phase system and are working together as an unbalance load compensator, as active power filter and as static VAR compensator for such three-wire system.
Figure 10:
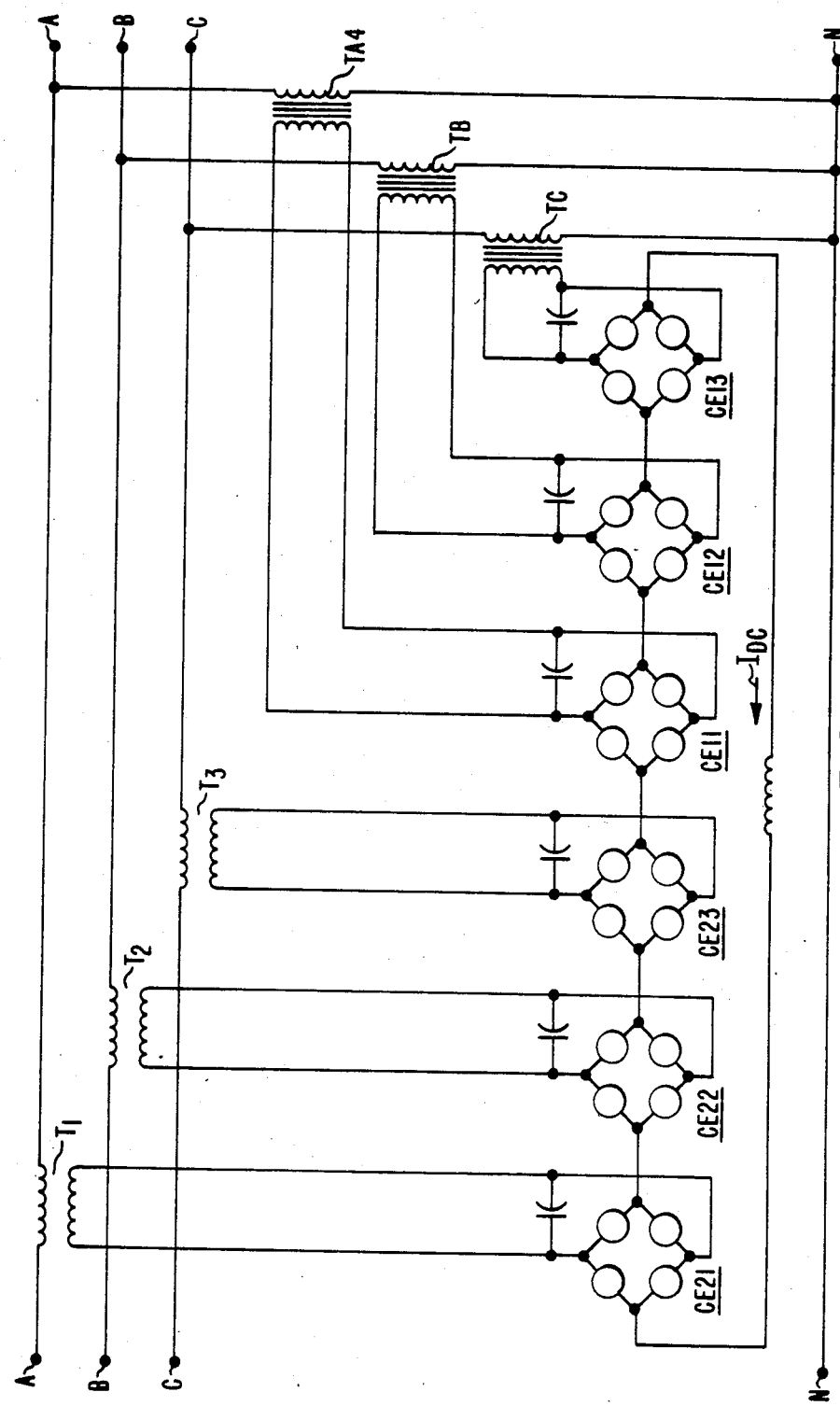
FIG. 10 is circuitry analogous to the circuit of FIG. 6B, in which three conditioning elements are used, in parallel for the line-to-neutral voltages of a three-phase system, and three buck/boost regulators are associated with the respective phases, all with a common internal DC current source.

Referring to FIG. 10, three buck/boost voltage regulators system, each like the one shown in FIG. 6B, are shown associated with a three-phase AC system. CE21, CE22 and CE23 correspond to conditioner element CE2 of FIG. 6B but are associated with phase lines A, B, C and coupled through transformers T1, T2, T3, respectively. CE11, CE12 and CE13 are equivalent to CE1 of FIG. 6B, being coupled through respective transformers TA, TB, TC across the phase and neutral for lines A, B and C, respectively. Referring to FIG. 11, the three conditioner elements CE11, CE12 and CE13 of FIG. 9 are shown, without the buck/boost regulator aspect, thus being mounted across phase lines in a delta-connected three-phase AC system. From what has been said before, it is clear that control of the static bridges will provide compensation for unbalanced load in the three-phase system, and/or control power filtering, and/or static VAR compensation for the three wire system there shown. The common DC source is a current source having an inductor L as storage element. The active terminals of the bridge are connected across the phase lines by respective transformers TAB, TBC and TCA.

Figure 12:
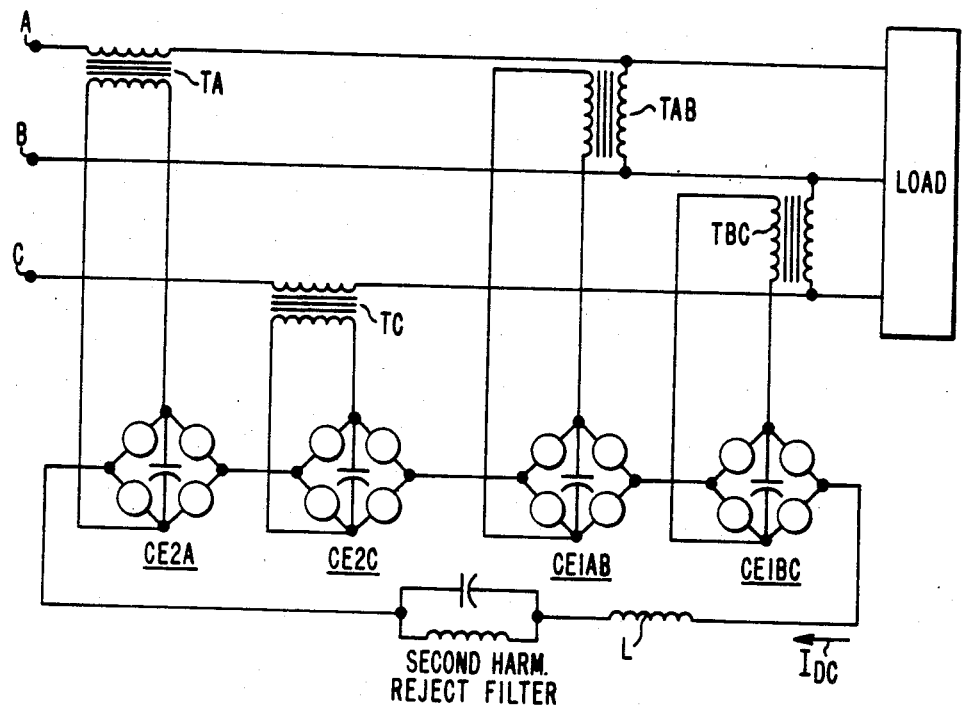
FIG. 12 illustrates effecting VAR compensation, in a 3-phase system, with a pair of active power filters mounted in parallel between two respective pairs of AC lines and with a pair of buck/boost regulators mounted in series with two respective AC lines, an alternate approach to active filter, buck/boost regulation and static VAR compensation according to the invention.

Referring to FIG. 12, in this embodiment of the invention two conditioner elements CE2A and CE2C are equivalent to conditioner element CE2 of FIG. 6B. They act as buck/boost regulators on phase lines A and C, respectively. Moreover, two conditioner elements CE1AB and CE1BC are provided equivalent to conditioner element CE1 of FIG. 5B, they being coupled between two phase lines (AB and BC, respectively). With the three-phase AC system, it is observed that only two buck/boost voltage regulators are necessary, and only two active power conditioners are necessary with such three-phase, three-wire system.

Figure 13:
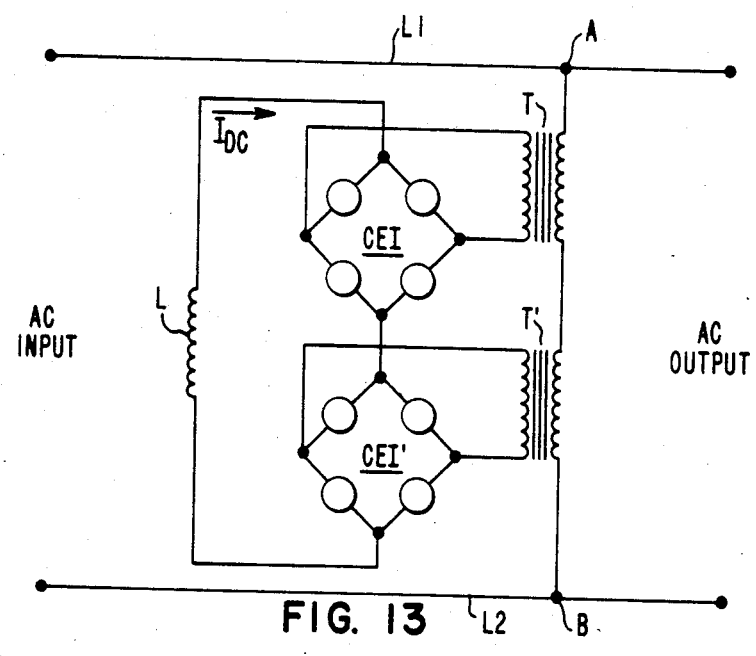
FIG. 13 illustrates the use of one shunt-connected active power filter having series-connected conditioner elements used for staggered phase carrier cancellation.

FIG. 13 shows two conditioner elements CE1 and CE1' connected in series and connected together in shunt across nodal points A, B of the AC lines L1, L2, respectively, using respective transformers T, T'. In such a system, the active elements are controlled with staggered displaced carriers, so that the resultant HF carrier ripple frequency in both the DC source and the DC output be increased, while the amplitude is descreased proportionally to the numer of elements used (two in the illustration of FIG. 12).

The use of staggered phase carrier cancellation allows the use of lower switching frequency and of smaller filters to alternate the resultant carrier frequency components. It is also well suited in higher power applications to minimize switching losses.

It is understood that more combinations of conditioner elements are conceivable in the light of the illustrative examples given by FIGS. 6A, 6B, 9, 10, 11, 12 and 13. The particular, where a DC current source has been used to describe the operation of the system according to the invention, a DC voltage source is equally possible.

We claim:

1. A system for power conditioning a line of supply of AC power from an AC source to an AC load, comprising:

a first array of static power switches mounted across one or said AC source and AC load;

a second array of static power switches coupled in series with said AC supply line;

a DC source connected between said first and second arrays;

first controlling means operative upon said first array in one of two modes to effect conversion between said one of said AC source and AC load on one side and said DC source on the other side;

second controlling means operative upon said second array in one of two modes to effect conversion between said DC source on one side and said AC supply line on the other side;

said first array operating as a rectifier when said second array operates as an inverter, and said first array operating as an inverter when said second array operates as a rectifier;

whereby said first and second controlling means provide one of a buck and boost voltage on said AC supply line while maintaining said DC source constant.

2. The system of claim 1 with said DC source being a voltage source.

3. The system of claim 1 with said DC source being a current source.

4. The system of claim 2 with said DC source including a capacitive storage element, said first array and first controlling means being operative to charge said capacitive storage element when said second array and said second controlling means provide a boost voltage on said AC power supply line; and said first array and first controlling means being operative to discharge said capacitive element when said second array and second controlling means provide a buck voltage on said AC supply line.

5. The system of claim 3 with said DC source including an inductive storage element, said first array and first controlling means being operative to supply DC current to said inductive storage element when said second array and second controlling means provide boost voltage on said AC supply line; and said first array and first controlling means being operative to absorb DC current from said inductive storage element when said second array and second controlling means provide a buck voltage on said supply line.

6. The system of claim 1 with said second controlling means being operative in response to a reference signal of a desired voltage across said one of said AC source and AC load to maintain such desired voltage; and with said first controlling means being operative in response to a reference signal characteristic of said DC source to maintain said DC source constant.

7. A system for power conditioning a supply of AC power from a multi-phase AC source to an AC load via at least two AC lines, comprising:

at least two arrays of static power switches coupled to a common DC source;

one of said two arrays of static power switches being connected in parallel to one of said AC source and AC load; the other of said two arrays of static power switches being connected in series with the other of said AC source and AC load on one of said AC lines;

with the provision of respective first and second means for controlling said arrays to exchange power between said DC source and said AC lines and between said AC lines and said common DC source;

with said first and second controlling means being operated to provide buck/boost voltage regulation on said AC lines.

8. A system for power conditioning a 3-phase AC supply of AC power from three balanced AC sources to unbalanced AC loads via corresponding AC lines, comprising:

three arrays of static power switches coupled to a common DC source and separately coupled across respective pairs of said AC lines;

with the provision of respective first and second means for controlling said arrays to exchange power between said DC source and said AC lines and betweeen said AC lines and said common DC source; and with said first and second controlling means being operated to balance said AC loads via said pairs of AC lines.

9. A system for power conditioning a supply of AC power from a multi-phase AC source to an AC load via at least two AC lines, comprising:

at least two arrays of static power switches coupled to a common DC source;

one of said two arrays of static power switches being connected in parallel to one of said one AC source and AC load; the other of said two arrays of static power switches being connected in series with the other of said AC source and AC load on one of said AC lines;

with the provision of respective first and second means for controlling said arrays to exchange power between said DC source and said AC lines and between said AC lines and said common DC source; and with said first and second controlling means providing ripple compensation on at least one of said AC lines.

10. A system for power conditioning a supply of AC power from a three-phase Ac source to an AC load, via star-connected phase lines and a neutral line, comprising:

three arrays of static power switches each in a bridge;

each bridge having one side connected in shunt across one corresponding phase line and neutral;

said bridges having a DC source in common on the other side;

means being provided with each bridge for controlling the switches to provide balanced load compensation between the phase lines.

11. The system of claim 10 with said controlling means providing reactive power on said one side for static VAR compensation.

12. The system of claim 11 with said controlling means providing active filtering with at least one of said bridges.

13. A system for power conditioning a supply of AC power from a three-phase AC source to an AC load, via delta-connected AC phase lines, comprising:

at least two arrays of static power switches each in a bridge;

each bridge having one side connected in shunt across a corresponding pair of said phase lines;

said bridges having a DC source in common on the other side;

means being provided with each bridge for controlling the switches to provide balanced load compensation between the phase lines.

14. The system of claim 13 with said controlling means providing reactive power on said one side for static VAR compensation.

15. The system of claim 14 with said controlling means providing active filtering with at least one pair of said phase lines.

16. A system for power conditioning a supply of AC power from a three-phase AC source to an AC load, via delta-connected AC phase lines, comprising:

a first pair of arrays of static power switches each in a bridge, each bridge of said first pair having one side connected in shunt across a corresponding pair of said phase lines;

a second pair of arrays of static power switches each in a bridge, each bridge of said second pair having one side coupled in series with a separate one of said AC phase lines;

a DC source being provided in common to said other sides of said two pairs of bridges;

first and second means being respectively provided for controlling said bridges of said second pair to provide buck/boost voltage regulation on said AC phase lines;

second and fourth means being provided for controlling said bridges of said first pair to maintain said DC source constant.

* * * * *